United States Patent Office 3,208,904
Patented Sept. 28, 1965

3,208,904
CHLORINATED CAMPHENE-DICHLOROCARBENE ADDUCT AND USE AS INSECTICIDE
George A. Buntin, Wilmington, Del., assignor to Hercules Powder Company, Wilmington, Del., a corporation of Delaware
No Drawing. Filed May 23, 1962, Ser. No. 196,865
2 Claims. (Cl. 167—30)

This invention relates to chlorinated hydrocarbons having insecticidal properties and to the method of their preparation.

It is known to chlorinate various terpenes by contact with chlorine for the production of insecticides.

In accordance with the present invention it has now been found that improved chlorinated hydrocarbons for insecticidal purposes are produced by reacting a terpene with dichlorocarbene and then contacting the terpene-dichlorocarbene adduct with chlorine until a chlorinated hydrocarbon having 60–70% combined chlorine is obtained.

Dichlorocarbene reacts at the double bond of terpenes to form a simple adduct in which the unsaturated carbon atoms of the terpene involved form a three member ring with the dichlorocarbene. In the case of bicyclic terpenes having only one double bond, one dichlorocarbene enters into the reaction. In th ecase of other terpenes, one dichlorocarbene reacts for each double bond present. These adducts are then chlorinated further by adding chlorine to the heated adduct until a suitable amount of chlorine is introduced. For insecticide purposes the total chlorine content of the product is 60–70%. The optimum amount of chlorine is slightly variable with the different chemical structures of the terpene used in this range of chlorine content.

The present invention is illustrated by the following examples in which all parts and percentages are by weight.

*Example 1*

A mixture of 110 parts camphene and 50 parts sodium methoxide in 400 parts isooctane was cooled to 0° C.. in a nitrogen atmosphere and 166 parts ethyl trichloroacetate was added slowly. The temperature was maintained at 0° C. for 8 hours by cooling and the mixture was then allowed to stand at 25° C. for 16 hours. The mixture was diluted with 200 parts water and the organic layer was washed with fresh water and dried over sodium sulfate. The solvent was removed by distillation and the product was distilled at 71–73° C./0.3 mm. It analyzed: $n_D^{20}$ 1.5048; Cl 33.9%. Calculated 32.4% Cl. An infrared absorption band at 9.8$\mu$ indicated the presence of a cyclopropane ring in the adduct.

A solution of 20 parts camphene-dichlorocarbene adduct in 320 parts carbon tetrachloride was heated at 70° C. in ultraviolet light while 35 parts chlorine gas was introduced. A 25% aliquot was taken from which the solvent was distilled off and the product was recovered as a viscous yellow liquid analyzing 61.55% Cl. Chlorination was continued until 40 parts chlorine had been added and a second sample was recovered. It amounted to 5.8 parts and analyzed 62.64% Cl. After further chlorination of the residue a third sample amounting to 5 parts and analyzing 63.62% Cl was taken. The residue was further chlorinated until a total of 55 parts chlorine had been added, and the chlorinated residue amounting to 13.2 parts analyzed 67.71% Cl.

These samples of chlorinated dichlorocarbene-camphene adducts ranging from 61.55 to 67.71% chlorine were all toxic to houseflies (LD$_{50}$ about 13 mg./kg. fly weight) and to southern armyworm at 0.03% concentration in aqueous dispersion. By repeat chlorinations the peak toxicity was found to be in the range of 65.7–66.6% chlorine. At 65.7% chlorine the toxicity of a 0.03% dispersion to southern armyworms was 60% kill.

*Example 2*

Following the procedure of Example 1, 110 parts $\alpha$-pinene was reacted with dichlorocarbene produced in situ by reaction of 165 parts ethyl trichloroacetate with 50 parts sodium methoxide. The $\alpha$-pinene-dichlorocarbene adduct obtained amounted to 102 parts, B.P. 85–87° C./0.06 mm.

A solution of 30 parts of $\alpha$-pinene-dichlorocarbene adduct in 320 parts carbon tetrachloride was contacted with chlorine while exposed to ultraviolet light. After 55 parts chlorine had been added, a sample was taken, and after each subsequent addition of 10 parts more chlorine, subsequent samples were taken. These amounted to 11.2 parts, 11.3 parts, 7.7 parts, and 14.8 parts and the samples analyzed 61..8% Cl, 63.8% Cl, 65.1% Cl and 67.5% Cl.

Each of these chlorinated $\alpha$-pinene-dichlorocarbene adducts was toxic to houseflies and southern armyworms, the maximum toxicity being in the range of 65–67.5% chlorine.

$\beta$-pinene and fenchene also react similarly with dichlorocarbene and the adducts are readily chlorinated to a chlorine content in the range of 60–70%. These chlorinated bicyclic terpene-dichlorocarbene adducts show their optimum toxicity at about 65–67% chlorine content.

While the examples show the preparation of dichlorocarbene only by reaction of sodium methoxide with trichloroacetic acid ester, it may also be made by reaction of hexachloroacetone with sodium methoxide or other alkali compound and the process of preparation of the adduct is not limited to any particular method of preparing the dichlorocarbene, various other methods being known in the art. Since the dichlorocarbenes are short lived, they are generated in situ in the presence of the terpene of which it is desired to form the adduct.

The adduct formation takes place over a wide range of temperatures from below 0° C. to 150° C., or higher if desired. No particular temperature is required for the reaction, the reaction being rapid once the dichlorocarbene is formed in the presence of the terpene.

The chlorination of the adduct is carried out by contacting the adduct with chlorine at a temperature at which chlorination will take place but below the decomposition point of the product. The polychloro-compounds tend to decompose at their boiling point and the chlorination is, therefore, carried out below the boiling temperature of the material being chlorinated. The temperature of chlorination is generally kept below about 150° C. and is ordinarily carried out at above 0° C., since at lower temperatures the rate of chlorination is impractically slow. The usual range of chlorination temperature is 50° C. to about 100° C. While initial stages of chlorination, particularly the stage of addition chlorination, may be carried out at low temperatures, the final stages of chlorination must be carried out in the range above 50° C. in order to reach a sufficiently high chlorine content to reach the desired toxicity.

The chlorination may be carried out in the presence or absence of catalysts but the reaction rate is impractically slow, especially toward the end of the chlorination, in the absence of catalysts and catalysts in an effective amount are, therefore, generally used for practical operation. Light is one of the most satisfactory catalysts and this is preferably actinic light. It acts by accelerating the formation of free radicals. Other catalysts may also be used by adding them to the chlorination mixture either at the beginning, during the course of, or toward the end of the chlorination process. As catalysts, one may use free radical formers such as lead alkyls and organic peroxides including peroxy acids and peroxy anhydrides.

Only a catalytic amount of catalyst is needed and, if used up in the process, more will be added as required. More than a catalytic amount will not ordinarily be added at one time since better control is obtained by using only as much as is necessary for attaining the desired rate of chlorination. The preferred catalysts of this type are the organic peroxides, particularly benzoyl peroxide or acetyl peroxide. The amount of peroxide catalyst used in the chlorination will ordinarily be within the range of about 0.001 to 5% based on the chlorination mixture.

The chlorination is generally carried out in the liquid state. For instance, a volatile chlorinated solvent such as methylene chloride, chloroform, carbon tetrachloride, ethylene chloride, trichloroethane, tetrachloroethane, or pentachloroethane is generally used in order to maintain the liquid state and to reduce the viscosity sufficiently for good contact. Any well-known means of contacting the chlorine with the adduct may be used. A satisfactory method involves dispersing chlorine gas in the liquid and relying on the flow of the gas for agitation. Auxiliary agitation may also be supplied. Since the reaction is ordinarily carried out at atmospheric pressure, the solvent is chosen according to its boiling point so that the refluxing solvent can provide a satisfactory means of temperature control. When a solvent is used, the amount ordinarily is kept below about 20 volumes per volume of adduct being chlorinated and is generally within the range of 1–5 volumes.

The chlorinated compound is readily purified and freed of catalysts by washing with water until sufficiently free of hydrochloric acid and then washing with mild alkali until neutral. The peroxidic catalysts are ordinarily completely removed by this procedure. After purification, the solvent is removed by distillation, preferably under reduced pressure.

The products of chlorination of the adducts when chlorinated in the above-designated temperature range still have the same carbon skeleton or ring system of the adducts.

The chlorinated bicyclic terpene-dichlorocarbene adducts are used as insecticides in the form of aqueous dispersions or as dusts. Concentrates of the toxicant are made up from the toxicant and a dispersing agent, which may be solid or liquid. A liquid concentrate is made up for example from about equal parts of toxicant, an organic solvent, and an emulsifying agent and these are diluted with water in the field to very low concentrations. Similarly dust concentrates are made up by dispersing a concentrated solution of toxicant in an organic solvent or talc, clay or similar finely divided carrier and this concentrate is dispersed in water or solid finely divided carrier to make a dilute dust for killing agricultural pests. Concentrates will usually contain at least 25% of toxicant and an inert dispersing agent such as organic solvent and emulsifying agent in the case of liquid concentrates or a finely divided solid carrier for the dust concentrates.

The insecticide composition as used for control of insects is used at concentrations ranging from 0.001 to 15% toxicant in an aqueous inert insecticidal carrier composition or in a solid finely divided inert carrier composition.

The insecticidal compositions of this invention are generally produced by admixing the chlorinated compound having a chlorine content within the range of about 60% to about 70% with a suitable carrier which is an inert material to facilitate the mechanical distribution of the polychloro-compound. Inert materials which are suitable carriers are added for the purposes outlined in Frear (Chemistry of Insecticides, Fungicides, and Herbicides by Donald E. H. Frear, Second Edition, 1948, page 5) to form sprays, dusts, and aerosols from the chlorinated compound. Surface-active dispersing agents are used in admixture with the chlorinated compound to promote the spreading of the toxic material so as to improve its effectiveness. They are used in both aqueous sprays and dusts. Hydrocarbon solvents such as deodorized kerosene are also used in sprays as the sole inert material to facilitate the mechanical distribution of the toxicant.

Suitable surface-active dispersing agents for use in the compositions of this invention are those disclosed by Frear (l.c., pages 280–287) for use with known insecticides and include soaps of resin, alginic, and fatty acids and alkali metals or alkali amines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, and bentonite and related hydrated aluminum silicates having the property of forming a colloidal gel. Among the other surface-active dispersing agents, which are useful in the compositions of this invention are the omega-substituted polyethylene glycols of relatively long-chain length, particularly those in which the omega substituent is aryl, alkyl, or acyl. Compositions of the chlorinated compound and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents. Thus, the chlorinated compound admixed with these inert carrier materials which facilitate the mechanical distribution of the chlorinated compound in accordance with this invention include those containing the above listed surface-active dispersing agents and hydrocarbon solvent dispersing agents.

The amount of chlorinated compound in the composition with the inert carrier material will depend upon the type of inert material and the use to which it is to be put. The concentrate compositions will generally contain more than about 25% chlorinated compound. Agricultural dusts may contain 40–60% chlorinated compound as concentrates and will generally contain 1–5% chlorinated compound in the diluted form as used. Household sprays will contain from 0.1 to 10% chlorinated compound, preferably about 2.5% in deodorized kerosene, but concentrates may contain 25–90% chlorinated compound. Agricultural sprays will, likewise, contain 0.1 to 10% of the chlorinated compound. Aqueous emulsions will contain sufficient surface-active dispersing agent to maintain an emulsion of the chlorinated compound during the spraying process. Concentrates from which emulsions are made may contain 25–90% chlorinated compound along with the surface-active dispersing agent.

For many purposes it may be desirable to use the chlorinated compound in combination with other insecticidal toxicants. Many toxicants have a very high knockdown in relatively dilute solutions, but higher concentrations must be used in order to obtain the desired degree of kill. Due to the very high degree of killing power which the chlorinated compound possesses, this compound may be added to such toxicants, thereby enabling the use of much more dilute solutions than would otherwise be possible. Toxicants with which this chlorinated compound may be combined include such compounds as rotenone, pyrethrum, and organic thiocyanates such as alkyl thiocyanates, thiocyanoethers such as $\beta$-butoxy-$\beta'$-thiocyanoethyl ether, and terpene thiocyanoacylates such as isobornyl thiocyanoacetate, fenchyl thiocyanoacetate, isobornyl $\alpha$-thiocyanopropionate, etc.

The insecticidal compositions of this invention are useful in combatting flies, mosquitoes, roaches, moths, carpet beetles, bedbugs, boll weevils, boll worms, armyworms, grasshoppers, and many other pests.

What I claim and desire to protect by Letters Patent is:

1. A chlorinated camphene-dichlorocarbene adduct containing 60–70% combined chlorine produced by chlorinating camphene-dichlorocarbene adduct dissolved in an inert solvent with chlorine gas in the presence of a free-radical forming chlorination catalyst at a temperature in the range of 0–150° C.

2. An insecticide concentrate composition comprising a chlorinated camphene-dichlorocarbene adduct of claim 1 and an inert dispersing agent.

References Cited by the Examiner

UNITED STATES PATENTS

| | | | |
|---|---|---|---|
| 2,481,160 | 9/49 | Schmerling | 260—648 |
| 2,533,052 | 12/50 | Schmerling | 260—648 |
| 2,546,174 | 3/51 | Stonecipher | 167—30 |
| 2,546,175 | 3/51 | Stonecipher | 167—30 |
| 2,657,167 | 10/53 | Walton | 260—648 |
| 2,767,115 | 10/56 | Schultz et al. | 260—648 |

OTHER REFERENCES

Doering et al.: "Jour. Am. Chem. Soc.," vol. 76 (1954), page 6162–5.

Wagner: "Proc. Chem. Soc., London," 1959, pp. 229.

LEON ZITVER, *Primary Examiner.*

MORRIS O. WOLK, ALPHONSO D. SULLIVAN,
*Examiners.*